Feb. 19, 1963 W. S. DRUZ ET AL 3,078,444

REMOTE CONTROL SYSTEM

Filed March 11, 1960

INVENTORS
Walter S. Druz
John Isabeau
By Francis W. Crotty
Atty.

United States Patent Office 3,078,444

Patented Feb. 19, 1963

3,078,444

REMOTE CONTROL SYSTEM

Walter S. Druz, Bensenville, Ill., and John Isabeau, Mountain View, Calif., assignors to Zenith Radio Corporation, a corporation of Delaware Filed Mar. 11, 1960, Ser. No. 14,299

6 Claims. (Cl. 340—171)

The present invention pertains, in general, to a remote control system to be actuated by command signals the intensity of which may vary over a considerable range. More particularly, the invention is directed to an improvement which relaxes the power requirements of the control system preceding the relays which are actuated to accomplish desired controlled functions.

Remote control systems are subject to a variety of applications and are especially suited to permit a viewer to control different operating characteristics of a television receiver or the like from a remote distance. An arrangement of the general type under consideration is described and claimed in Patent 2,817,025 issued on December 17, 1957 in the name of Robert Adler and assigned to the same assignee as the present invention.

As described in the Adler patent, the system has two principal parts, namely, a transmitter that may be carried in the hand and a remote amplifier usually integrated into the cabinetry of the television receiver to be controlled. The transmitter generates a number of command signals of distinctly different frequencies to facilitate their segregation in the remote amplifier. The number of signals required is determined by the number of controlled functions desired; a very convenient system as described in the Adler patent features the use of four distinctly different commands. Each may be generated by a mechanical vibrator percussively struck to be set into longitudinal-mode vibration or, alternatively, by an electric oscillator driving an electromechanical transducer. In any event, it is desirable to select the frequencies of the command signals in the supersonic range and to choose their particular frequencies to avoid interference in respect of the characteristic scanning frequencies of the television receiver as well as their harmonics. A very convenient location for the command signals is the region of 40 kc.

The remote amplifier has a transducer, usually in the form of a microphone, to intercept the command signal and derive an electric signal therefrom. Where the transmitter is constructed to be carried in the hand, its distance from the remote amplifier may vary greatly resulting in a wide variation in intensity of the received command signal. Accordingly, the amplifier is generally characterized by a high gain so that the transmitter may operate over a satisfactory range. Limiting is also usually provided to the end that the signal, which ultimately reaches the frequency-selective control relay, has a fixed or restricted amplitude. Utilization of frequency-selective relays, of course, facilitates segregating received command signals from one another and directing them to accomplish the controlled functions assigned to each.

In arrangements of the type under consideration, the signal thus applied to the relay has to supply the power to actuate the relay and accomplish the work function. This imposes a certain power requirement on the preceding stages of the amplifier which may readily be accommodated in control systems employing vacuum tubes. It is desirable, however, particularly in installations where the remote amplifier employs transistor stages, to reduce the power requirements and this is achieved most effectively in the arrangement to be described herein.

Accordingly, it is a principal object of the present invention to provide a novel and improved remote control system of general utility and especially suited for the control of television reecivers.

It is a specific object of the invention to provide a remote control system in which the power requirements in the stages preceding the control relays are minimized.

It is a further specific object of the invention to provide an improved remote control system in which a control relay, when once triggered into actuation, is driven by a constant amount of power to assure its actuation.

Remote control systems to which the present invention is particularly applicable are subject to be actuated by command signals the intensity of which may vary over a wide range. Such a system, constructed in accordance with one aspect of the invention, comprises a transducer for receiving the command signal. A wave signal repeater device has an input circuit including a first feedback coil shunt connected to the input circuit and has an output circuit including a second feedback coil inductively coupled to the first feedback coil to provide regenerative feedback for the device and to complete the circuitry of a blocking type relaxation oscillator. There are biasing means for normally maintaining the repeater device non-conductive and for establishing a threshold amplitude level for the oscillator. An amplitude-limiter is coupled to the transducer, for deriving therefrom a command signal of limited amplitude. A detector having an input coupled to the amplitude-limiter and having a load circuit comprising a capacitor is coupled to the oscillator to establish conduction therein in response to the detection of a command signal of a predetermined minimum duration. Finally, there is a work circuit responsive to current flow in the output circuit during conductive intervals of the oscillator for accomplishing a controlled function.

The features of the present invention which are believed to be novel are set forth with particularity in the appended claims. The organization and manner of operation of the invention, together with further objects and advantages thereof, may best be understood by reference to the following description taken in connection with the accompanying drawing, in the several figures of which like reference numerals identify like elements, and in which:

Figures 1, 2, 3, 4:
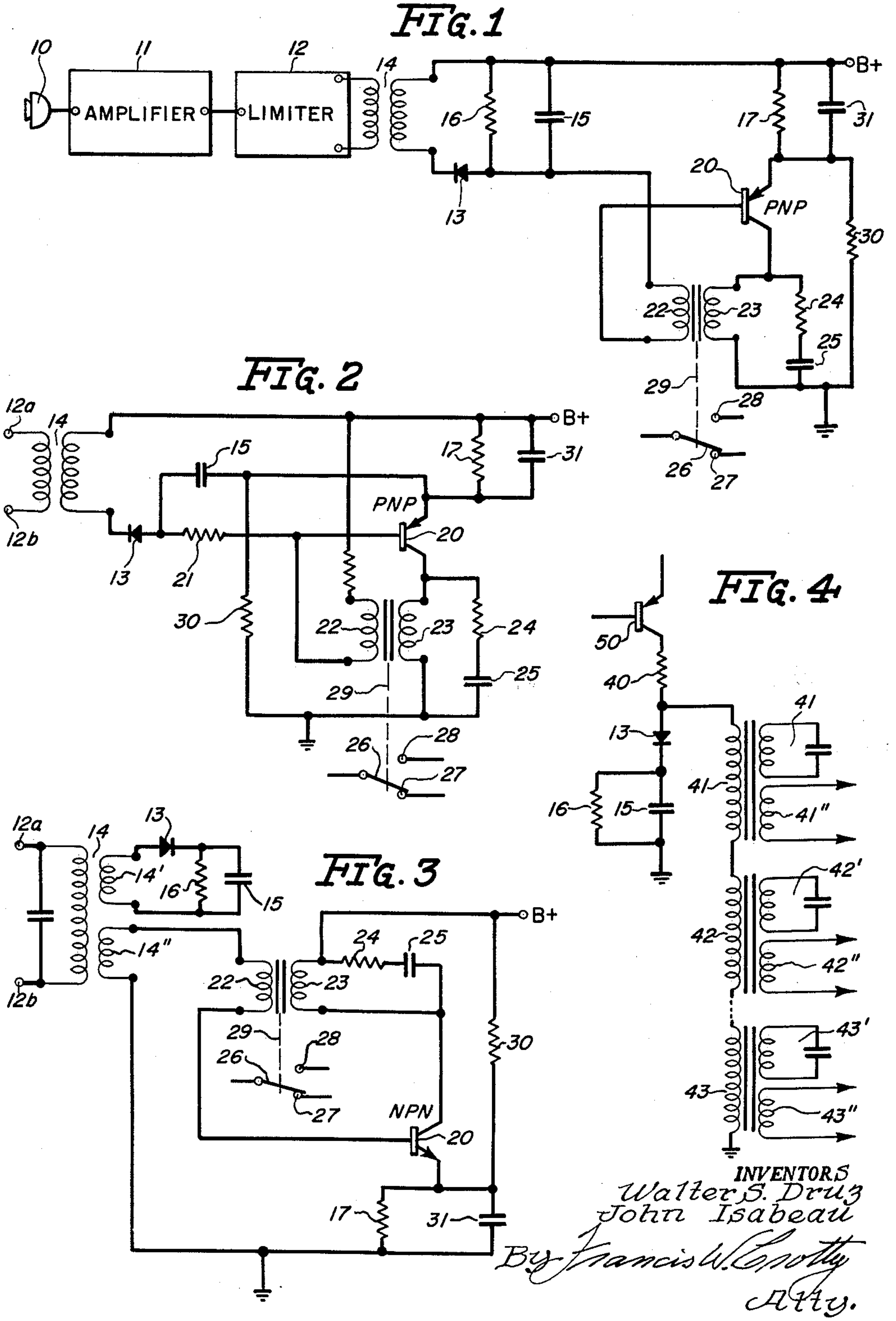
FIGURE 1 is a schematic diagram of the remote amplifier portion of a remote control system embodying the invention in one form.
FIGURES 2 and 3 are schematic representations of modifications of a portion of the system of FIGURE 1.
FIGURE 4 represents still another modification of the relay actuating arrangement of the remote control system.

Before considering the details of the remote amplifier, it is appropriate to point out that the invention is not predicated in any way on the structure or operation of the transmitter employed to radiate command signals to the remote amplifier. For that reason, no transmitter structure has been specifically shown nor will one be described in detail. Suffice it to say that it may be an electric oscillator which radiates a signal of the prescribed frequency, or an electromechanical or purely mechanical resonator for developing a supersonic signal. One mechanical system which is attractive and convenient in the important considerations of size and operation is described in the aforesaid Adler patent. Of course, the number of individual generating elements included in the transmitter is dictated by the number of specifically different command signals desired. In the usual case where the control system is to permit bidirectional tuning of a television receiver plus on/off and muting or volume control it is necessary to provide four generating units in the transmitter and to adjust each to radiate the particular one of four different command signals in the neighborhood of 40 kc. as an illustrative example.

The remote amplifier of FIGURE 1 for cooperating wtih such a transmitter comprises a transducer 10 for receiving the command signal and for developing a related electrical signal. This usually takes the form of a conventional microphone or a microphone arranged to have an acceptance band centered about 40 kc. for the case under consideration and restricted in width so as to encompass essentially only that portion of the frequency spectrum including the several command signals employed in the operation of the system.

Since in the usual installation the distanec of the transmitter from the microphone varies at the whim of the user, the command signal as received and the control signal developed in microphone 10 are subject to variation over a wide range of intensities and it is desirable that a signal of fixed or limited amplitude be used for actuating the relays which control the work functions of the system. Accordingly, the microphone is followed by an amplifier 11 and means for controlling or restricting the amplitude of the amplified signal. This means may be an automatic volume control arrangement or a limiter 12 coupled to the output of the amplifier as indicated. If the microphone 10 has a very wide acceptance band, it is also preferable to employ transformer coupling between two successive stages of amplifier 11 in order that, by appropriate design of the transformer, the bandwidth of the system may be restricted to encompass only that narrow portion of the frequency spectrum which includes the command signals.

Coupled to limiter 12 is a detector for detecting or rectifying the amplitude-limited command signal. This detector includes a diode 13 having an input coupled by means of a transformer 14 to the output of limiter 12. The load circuit of the detector is of the usual resistance-capacitance type including capacitor 15 and a resistor 16.

The signal voltage developed by detector 13 is employed to trigger a wave signal repeater arranged in a manner analogous to a blocking type relaxation oscillator. Such a repeater is, in essence, a wave signal amplifier provided with regenerative feedback in the usual fashion of an oscillator and may be constructed to include a vacuum tube or a transistor device. As shown, the repeater comprises a three-element transistor 20 of the PNP type having input electrodes connected in series with detector 13. More specifically, the base electrode is connected to one side of the detector load circuit 15, 16 through a first feedback coil 22 while the emitter is connected to the other side thereof by means of a resistor 17 and a capacitor 31.

The output circuit of the transistor is connected to the emitter and collector electrodes and comprises a second feedback coil 23 inductively coupled to feedback coil 22 to provide regenerative feedback for the device as required to complete the circuit of a blocking type relaxation oscillator. Since the output circuit is also to include the control relay through which the work circuit is controlled, this second feedback coil 23 may be provided by the energizing coil of the relay although it is appreciated that a separate feedback coil may be utilized if desired, connected in parallel or in series with the energizing coil of the control relay. A damping network consisting of a resistor 24 in series with a capacitor 25 is coupled across coil 23 to prevent ringing and spurious multiple actuations of the relay. The structure of the relay itself is of no particular moment and for that reason it has been represented symbolically as comprising the coil or winding 23 controlling a movable armature 26 which is displaceable between a pair of contacts 27, 28. The broken construction line 29 leading from this armature to winding 23 denotes the fact that energization of the winding displaces the armature from contact 27 against which it is momentarily resting into engagement with alternate contact 28 where it remains throughout the duration of the energizing pulse energizing coil 23; after the pulse interval, the armature returns to contact 27. The work function that is accomplished as the relay is displaced from one to the other of its pair of contacts is of no special concern and therefore the drawing has been simplified through a mere representation of conductor leads extending from the armature on one hand and contact pair 27, 28 on the other.

Transistor 20 is normally maintained in a non-conductive state by means of a biasing arrangement including resistor 17 and a resistor 30 serially-connected between a source of potential +B and a plane of reference potential, specifically, ground. The juncture of these resistors is connected to the emitter and is also bypassed for the command signal frequencies by a capacitor 31. The parameters of the biasing circuit establish a threshold amplitude level for transistor 20 and the oscillator in which it is incorporated, requiring that an input signal exceed the threshold before the oscillator is rendered conductive. Amplitude-limiter 11, 12 which is coupled to the oscillator through detector 13 is relied upon to apply a control signal to the transistor which has a level exceeding the threshold or triggering level of the oscillator if the command signal indures for a predetermined minimum period of time.

The system of FIGURE 1 may be characterized as a single channel remote control system in that it has but a single control relay 23. As stated earlier, remote control systems of the type under consideration normally have several such relays but it is convenient to consider the arrangement initially as a single channel system. Manifestly, multiple-channel operation may be attained by driving a series of detector-regenerative control relay arrangements from limiter 12 and by relying upon tuning of the detector input circuits for selective actuation of the several relays. A simplified multi-channel arrangement employing a single detector will be considered in detail hereinafter.

In the operation of the system, the transmitter (not shown) is actuated when it is desired to control relay 23 to accomplish a controlled function. The operation of the transmitter results in the transmission of a supersonic command signal of a particular frequency. This signal is picked up by microphone 10 and, after amplification in amplifier 11, is applied to limiter 12 from which it is delivered to detector 13 with an amplitude of known value established by the limiting level of unit 12. The amplitude-limited signal is detected in detector 13 and commences to establish a charge condition for capacitor 15. If the command signal exceeds a minimum predetermined duration, the charge established on capacitor 15 increases to a point where it exceeds the triggering level of transistor 20. In other words, the detected voltage is able to overcome the bias normally maintaining transistor 20 non-conductive. As a consequence, conduction is initiated in the transistor.

When conduction commences, current flows in the collector circuit and is fed back from winding 23 to winding 22 with a polarity tending further to increase conduction in the device. In this regenerative or cumulative fashion, the collector current increases steadily until saturation is attained. At that juncture, there is no further increase of collector current and therefore the increment of input voltage resulting from the feedback diminishes to zero leaving the transistor in a condition in which conduction ceases because the normal biases applied to the transistor are now augmented by certain charge effects established during the regenerative cycle. In particular, capacitor 31 charges and adds to the emitter bias and since capacitor 15 is in series with winding 22, it charges due to the feedback effect. The transistor remains cut-off and cannot be fired again until this blocking condition is removed. The charge of capacitor 15 dissipates through resistor 16 while capacitor 31 discharges through resistors 17 and 30 to restore the initial conditions of the oscillator.

During the conductive interval of the oscillator, a pulse of current traverses energizing winding 23 of the control relay which displaces its armature 26 from one to the other of its contacts 27, 28. Hence, the controlled function is accomplished.

The arrangement is an attractive one in that detector 13 is required to furnish only the power needed to exceed the regenerative threshold of device 20 and its associated circuit. The regenerative characteristics of the circuit of transistor 20 assure that a constant and necessary amount of actuating power is delivered to relay 23 each time that the voltage developed in the detector circuit in response to the reception of a command signal exceeds the triggering or firing level of the transistor.

Since capacitor 15 is in series with feedback winding 22, it receives a substantial charge during the regenerative cycle of the repeater and since resistor 16 has a high value, the arrangement has a long recovery time. That is, after the repeater has responded to a received command signal and actuated relay 23 there is a considerable period of time required to restore initial conditions in order that the relay may respond again. Moreover, the repeater has inferior temperature stability because of the impedance contributed to the base circuit by resistor 16. Improvement at least in respect to recovery time may be achieved through the arrangement of FIGURE 2.

Where this modification is to be employed, input terminals 12*a*, 12*b* of coupling transformer 14 are coupled to the output of limiter 12 in place of coupling transformer 14 of FIGURE 1 and its associated circuitry. In the modification of FIGURE 2, feedback winding 22 is in shunt to the detector whereas in the first-described embodiment they are in series. One terminal of the winding is connected to capacitor 15 through a resistor 21 of high value and the other terminal thereof is connected to capacitor 15 through bias resistor 17 and capacitor 31. Resistor 21 prevents capacitor 15 from short-circuiting the feedback winding.

The arrangement has a fast recovery time compared with that of FIGURE 1 since its recovery is determined primarily by capacitor 31 which discharges through the low impedance bias circuit of resistors 17 and 30. The presence of resistor 21 limits the amount of charge accumulated by capacitor 15 so that it does not have the primary role of determining recovery time as is characteristic of the embodiment of FIGURE 1. Resistor 21, however, imposes conflicting effects in respect of temperature stability and sensitivity. For improved temperature stability the resistor should have a low value but for high sensitivity it should have a high value to decrease the loading of the detector.

Still further improvement may be realized through the embodiment of FIGURE 3 which features improved temperature stability, an independently adjustable and inherently short recovery time, an independent adjustment of actuation time plus good sensitivity. As used here, "actuation time" is intended to mean the time duration of a received command that is required to develop an input signal to the repeater which exceeds its firing level and actuates relay 23. Where this modification is to be incorporated into the system, coupling transformer 14 is provided with three windings including a secondary 14′ and a tertiary 14″. Its primary may be tuned and have terminals 12*a*, 12*b* to facilitate its connection with limiter 12. The individual circuits of detector 13 and the regenerative repeater, including transistor 20, are generally similar to the corresponding portions of the arrangement of FIGURE 1 except that there is no conductive connected between them. Rectifier 13 and its load circuit 15, 16 are connected to secondary 14′ while the regenerative circuit, including transistor 20, is connected to tertiary 14″.

At the instant a command signal is received and an amplitude-limited signal is delivered to the output terminals of limiter 12, the loading of the system or its transient response is determined by the time constant of the detector. This loading permits the amplitude of the signal induced in the input of the detector to build up in accordance with a transient function determined primarily by the values of capacitor 15 and resistor 16. Since repeater 20 is inductively coupled to limiter 12 through a coupling arrangement that is subject to the loading effect of the detector, the signal induced in the input of the oscillator builds up in accordance with the same transient function and a level which exceeds the threshold or trigger level of the repeater is achieved only if the command signal has a minimum predetermined duration. When the repeater is triggered, transistor 20 commences to conduct and quickly achieves saturation because of the feedback provided by windings 22, 23. The pulse of collector current which flows during the conductive interval of the repeater operates the relay by actuating its armature 26 as previously described.

The transistor blocks when saturation of collector current has been attained, the regenerative cycle is terminated and the voltage across winding 23 falls to zero, causing the collector current to decrease which in turn causes a reverse or back bias voltage to appear across winding 22 rapidly driving transistor 20 to cut off. Capacitor 31, which has been charged during the regenerative cycle and because of its charge increases the bias potential of the transistor, keeps the transistor blocked until the charge is dissipated through bias resistors 17 and 30. When this has been accomplished, initial conditions shall have been restored to the repeater preparing it for its next actuation.

There are a number of distinguishing characteristics of the arrangement of FIGURE 3 which improve the performance in respect to that realized with the two preceding embodiments. It will be observed, for example, that there is only a high frequency coupling existing between detector 13 and the input circuit of transistor 20, where "high frequency" is here used to mean the frequency of the signal delivered from the limiter. In most cases, this corresponds to the frequency of the command signal received by microphone 10 although it may well be a harmonic of the received signal frequency as disclosed in the Adler patent. Because of the nature of the coupling, capacitor 15 of the detector does not acquire any charge due to conduction of transistor 20 during its regenerative cycle and this has a marked effect on the recovery characteristics of the repeater. Its recovery time is that required for capacitor 31 to discharge through bias resistors 17 and 30 and is inherently short. Moreover, it is adjustable independently of the actuation time, temperature stability and sensitivity. The recovery time is materially reduced from the arrangement of FIGURE 1 and the repeater may be re-triggered almost immediately although, in actual practice, the recovery time is not made that short. It is desirable to adjust the recovery time, through selection of the circuit parameters, to be longer than the time required to dissipate the energy stored in relay winding 23 through collector current flow during the regenerative cycle. This energy is dissipated through resistor 24 and capacitor 25 which provide critical damping for the relay winding.

It will further be observed that the actuation time of the repeater is determined primarily by load circuit 15, 16 of the detector so that it too may be adjusted independently of the other operating characteristics of the system.

The base-emitter or input circuit of transistor 20 has a low direct current impedance, low compared with the D.C. impedance of the preceding arrangements since it includes only windings 14″ and 22 and bias resistor 17. That is why the input circuit of the transistor, for the case under consideration, has no significant role in determining actuation time. It will also be apparent that the low impedance of the input circuit permits the regenerative repeater, once its triggering level has been exceeded by an applied signal, to attain saturation faster than in the arrangements of FIGURES 1 and 2 where resistors 16 and 21, respectively, contribute a high impedance to the base circuit. Therefore, the modification of FIGURE 3 is capable of faster actuation times than the preceding embodiments of the invention although in the usual installations the actuation time is purposely kept long, perhaps in the order of one-tenth of a second, for noise considerations. In other words, selection of the actuation time provides freedom against spurious actuation in response to noise by imposing on the system a requirement of minimum signal duration to actuate the repeater.

The low impedance of the base-emitter circuit in the modification of FIGURE 3 contributes to improved temperature stability. It is known that transistors exhibit a certain leakage current which generally varies with temperature. Where the base circuit includes a high D.C. impedance, such as resistor 16 in the arrangement of FIGURE 1 or resistor 21 in the arrangement of FIGURE 2, a voltage drop is developed which has a significant bearing in determining the operating or threshold level in the transistor. Since leakage current may vary, the operating point of the transistor may also vary with temperature in the presence of a high impedance in the base circuit which is undesirable since optimum performance requires that the trigger level of the relay be fixed in spite of variations in temperature. The embodiment of FIGURE 3, featuring an extremely low D.C. impedance in the base circuit, achieves this optimum condition and causes the operating point of the transistor to be substantially independent of the characteristics of the transistor which happens to be employed in the circuit. Transistors having poor temperature characteristics may be used without adversely affecting the operation of the system.

Finally, this arrangement has good sensitivity because detector 13 is lightly loaded.

FIGURE 4 represents a modification which facilitates accommodating multiple channel operation, that is to say, operation in response to a group of command signals individually having an assigned and distinctly different frequency. In this arrangement which is functionally equivalent to the structure of FIGURE 3, the collector circuit of transistor 50, which represents a transistorized form of limiter, includes resistor 40 series-connected with the primary windings of several multi-winding transformers 41, 42, 43, etc. The broken line portion of the circuit representation indicates that one may employ as many such transformers as desired. Detector 13 is coupled to the junction of resistor 40 and the primary of transformer 41 and has a load circuit 15, 16 which determines the transient response of the system. Transformer 41 has a secondary winding 41' tuned to an integral multiple of a particular one of the command signals, recognizing that the integer of multiplication may be one if desired. The third winding 41'' of this transformer is the counterpart of the third winding 14'' of the arrangement of FIGURE 3 and is the coupling from the limiter to one of a series of regenerative control relays individually having the same circuitry as that associated with transistor 20 of FIGURE 3 and otherwise not shown. Transformer 42 likewise has a tuned secondary 42' and a tertiary winding 42''. Winding 42' is tuned to a different assigned one of the command signals and the same is true of the tuned secondary 43' of the remaining coupling transformer shown in the drawing. Its tertiary winding 43'' also couples a regenerative control relay to limiter 50.

In the operation of this modification, an amplitude-limited control signal of a particular frequency provides maximum response from only one of the transformers 41–43, that being the one which is tuned to a frequency related to the frequency of the received signal. This response builds exponentially in accordance with the transient response imposed by the parameters of detector 13. When the signal level builds to an amplitude exceeding the triggering level of the regenerative control relay coupled to the responsive transformer, the work function which it controls is accomplished. In other words, tuning of the several control relays plus appropriate choice of Q for the transformer windings facilitates separation of the comand signals within the remote amplifiers as required for selective actuation of the several work circuits.

While particular embodiments of the invention have ben shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A remote control system to be actuated by a command signal the intensity of which may vary over a wide range, said system comprising: a transducer for receiving said command signal; a wave-signal repeater device having an input circuit including a first feedback coil and an output circuit including a second feedback coil inductively coupled to said first feedback coil to provide regenerative feedback for said device and complete the circuitry of a blocking-type relaxation oscillator; biasing means for normally maintaining said repeater device non-conductive and establishing a threshold amplitude level for said oscillator; an amplitude-limiter coupled to said transducer for deriving therefrom a command signal of limited amplitude; a detector having an input coupled to said amplitude-limiter and having a load circuit including a resistor and a capacitor for establishing the transient response of said detector such that a signal level corresponding to said threshold level is attained in said detector only in response to the reception of a command signal of a predetermined minimum duration; the input circuit of said repeater device having only an alternating-current coupling to said detector to effect conduction in said oscillator when the signal level in said detector exceeds said threshold level; and a work circuit responsive to current flow in said output circuit during conductive intervals of said oscillator for accomplishing a controlled function.

2. A remote control system to be actuated by a command signal the intensity of which may vary over a wide range, said system comprising: a transducer for receiving said comand signal; a wave-signal repeater device having an input circuit including a first feedback coil and an output circuit including a second feedback coil inductively coupled to said first feedback coil to provide regenerative feedback for said device and complete the circuitry of a block-type relaxation oscillator; biasing means for normally maintaining said repeater device non-conductive and establishing a threshold amplitude level for said oscillator; an amplitude-limiter coupled to said transducer for deriving therefrom a command signal of limited amplitude; a detector having an input coupled to said amplitude-limiter and having a load circuit including a resistor and a capacitor for establishing the transient response of said detector such that a signal level corresponding to said threshold level is attained in said detector only in response to the reception of a command signal of a predetermined minimum duration; the input circuit of said repeater device having a low direct-current impedance and having only an alternating-current coupling to said detector to effect conduction in said oscillator when the signal level in said detector exceeds said threshold level; and a work circuit responsive to current flow in said output circuit during conductive intervals of said oscillator for accomplishing a controlled function.

3. A remote control system to be actuated by a command signal of a particular frequency the intensity of which may vary over a wide range, said system comprising: a transducer for receiving said command signal; a wave-signal repeater device having an input circuit including a first feedback coil and an output circuit including a second feedback coil inductively coupled to said first feedback coil to provide regenerative feedback for said device and complete the circuitry of a blocking-type relaxation oscillator; biasing means for normally maintaining said repeater device non-conductive and establishing a threshold amplitude level for said oscillator; an amplitude-limiter coupled to said transducer for deriving therefrom a command signal of limited amplitude; a detector having an input coupled to said amplitude-limiter and having a load circuit including a resistor and a capacitor for establishing the transient response of said detector such that a signal level corresponding to said threshold level is attained in said detector only in response to the reception of a command signal of a predetermined minimum duration; means, resonant at an integral multiple of said frequency, for providing an alternating-current coupling from said detector to said oscillator to effect conduction in said oscillator when the signal level in said detector exceeds said threshold level; and a work circuit responsive to current flow in said output circuit during conductive intervals of said oscillator for accomplishing a controlled function.

4. A remote control system to be selectively actuated by a plurality of command signals of different frequencies the intensity of which may vary over a wide range, said system comprising: a transducer for receiving said command signal; a corresponding plurality of wave-signal repeater devices, individually having an input circuit including a first feedback coil and an output circuit including a second feedback coil inductively coupled to said first feedback coil to provide regenerative feedback for said device and complete the circuitry of a blocking-type relaxation oscillator; biasing means for normally maintaining each of said repeater devices non-conductive and establishing a threshold amplitude level for each of said oscillators; an amplitude-limiter coupled to said transducer for deriving therefrom a command signal of limited amplitude; a detector having an input coupled to said amplitude-limiter and having a load circuit including a resistor and a capacitor for establishing the transient response of said detector such that a signal level corresponding to said threshold level is attained in said detector only in response to the reception of a command signal of a predetermined minimum duration; a like plurality of coupling means, individually resonant at an integral multiple of an assigned one of said frequencies, for providing an alternating-current coupling from said detector to an associated one of said oscillators to effect conduction in one of said oscillators when the signal level in said detector exceeds said threshold level; and a like plurality of work circuits individually responsive to current flow in the output circuit of an associated one of said oscillators for accomplishing a controlled function.

5. A remote control system to be actuated by a command signal the intensity of which may vary over a very wide range, said system comprising: a transducer for receiving said command signal; a wave-signal repeater device having an input circuit including a first feedback coil shunt connected to said input circuit and an output circuit including a second feedback coil inductively coupled to said first feedback coil to provide regenerative feedback for said device and complete the circuitry of a blocking-type relaxation oscillator; biasing means for normally maintaining said repeater device non-conductive and establishing a threshold amplitude level for said oscillator; an amplitude-limiter coupled to said transducer for deriving therefrom a command signal of limited amplitude; a detector having an input coupled to said amplitude-limiter and having a load circuit comprising a capacitor coupled to said oscillator to establish conduction therein in response to the detection of a command signal of a predetermined minimum duration; and a work circuit responsive to current flow in said output circuit during conductive intervals of said oscillator for accomplishing a controlled function.

6. A remote control system to be actuated by a command signal the intensity of which may vary over a very wide range, said system comprising: a transducer for receiving said command signal; a wave-signal repeater device having an input circuit including a first feedback coil shunt connected to said input circuit and an output circuit including a second feedback coil inductively coupled to said first feedback coil to provide regenerative feedback for said device and complete the circuitry of a blocking-type relaxation oscillator; biasing means for normally maintaining said repeater device non-conductive and establishing a threshold amplitude level for said oscillator; an amplitude-limiter coupled to said transducer for deriving therefrom a command signal of limited amplitude; a detector having an input coupled to said amplitude-limiter and having a load circuit comprising a capacitor coupled to said oscillator to establish conduction therein in response to the detection of a command signal of a predetermined minimum duration; a resistor serially connected between said capacitor and said first feedback coil to limit charging current through said capacitor; and a work circuit responsive to current flow in said output circuit during conductive intervals of said oscillator for accomplishing a controlled function.

References Cited in the file of this patent

UNITED STATES PATENTS

| | | |
|---|---|---|
| 2,657,308 | Brandt | Oct. 27, 1953 |
| 2,801,374 | Svala | July 30, 1957 |

FOREIGN PATENTS

| | | |
|---|---|---|
| 1,161,135 | France | Mar. 17, 1958 |